United States Patent [19]

Iijima et al.

[11] Patent Number: 4,755,415
[45] Date of Patent: Jul. 5, 1988

[54] OPTICAL SHUTTER ARRAY AND METHOD FOR MAKING

[75] Inventors: Toshio Iijima, Warabi; Nobuharu Nozaki, Mimami-Ashigara; Hiroshi Sunagawa, Minami-Ashigara; Kazuhiro Kawashiri, Hachioji, all of Japan

[73] Assignee: Fuji Photo Film Co., Ltd., Kanagawa, Japan

[21] Appl. No.: 914,972

[22] Filed: Oct. 3, 1986

[30] Foreign Application Priority Data

Oct. 3, 1985 [JP] Japan ................................ 60-221056
Oct. 3, 1985 [JP] Japan ................................ 60-221058
Oct. 3, 1985 [JP] Japan ................................ 60-221059

[51] Int. Cl.$^4$ .......................... B05D 5/06; G02B 6/10
[52] U.S. Cl. .................................... 428/163; 428/156; 428/161; 428/168; 428/204; 428/901; 350/96.13; 350/96.14; 350/332; 350/339 F; 350/350 S
[58] Field of Search ............... 428/156, 161, 163, 168, 428/204, 901; 350/96.13, 96.14, 339 F, 332, 350 S

[56] References Cited

U.S. PATENT DOCUMENTS

| | | | |
|---|---|---|---|
| 4,634,226 | 1/1987 | Isogai et al. | 350/332 |
| 4,639,088 | 1/1987 | Suginoya et al. | 350/339 F |
| 4,648,686 | 3/1987 | Segawa | 350/96.13 |

Primary Examiner—John E. Kittle
Assistant Examiner—Patrick Ryan
Attorney, Agent, or Firm—Sughrue, Mion, Zinn, Macpeak and Seas

[57] ABSTRACT

An optical shutter array comprising a transparent substrate of a material exhibiting an electrooptic effect having parallel channels and electrodes of a conductive resin composition disposed in the channels can be driven with a lower voltage while minimizing crosstalk. Contact pads on the channel electrodes facilitate wire bonding to the electrodes, and a transparent dielectric film covering the substrate surface prevents damage to the electrodes by air discharge and provides abrasion resistance. The use of an anisotropic conductive connector and a flexible printed wiring connector ensures simple positive wire connection.

34 Claims, 13 Drawing Sheets

F I G. 11a
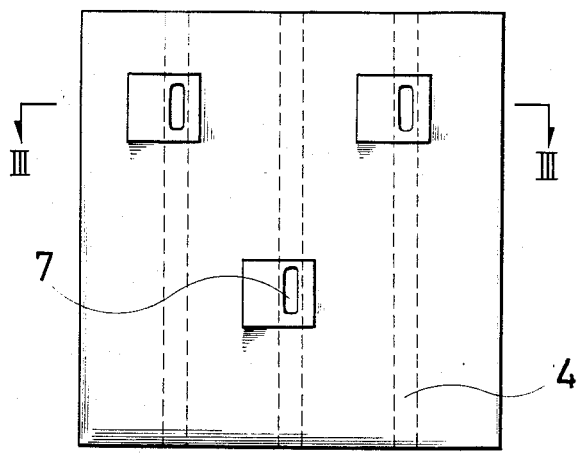
F I G. 11b
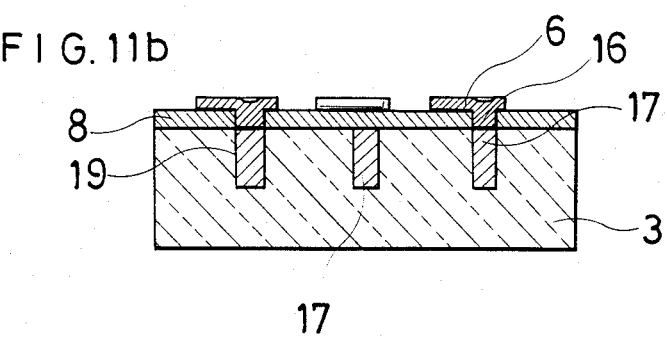

(unit μm)

(unit μm)

OPTICAL SHUTTER ARRAY AND METHOD FOR MAKING

BACKGROUND OF THE INVENTION

This invention relates to an optical shutter array utilizing electrooptic effect, and more particularly, to such an optical shutter array characterized by low driving voltage and simple wiring, and a method for making the same.

In recent years, electrooptic materials or materials exhibiting an electrooptic effect have been developed. The electrooptic effect is the phenomenon that indices of refraction are changed by an applied DC or low frequency (as compared with light frequency) electric field. As a typical example of these electrooptic materials is known a transparent ceramic PLZT material having a composition of 9/65/35, that is, 9 atomic percents of La and a molar ratio of $PbZrO_3/PbTiO_3$ of 65/35.

The PLZT finds one application as an optical shutter. The optical shutter is of the structure wherein a plate-shaped PLZT element having a pair of spaced-apart planar electrodes formed on one major surface thereof is interposed between a polarizer and an analyzer which are located such that their directions of polarization are perpendicular to each other. Light incident on the polarizer can be controlledly transmitted and interrupted by turning on and off a voltage applied to the electrodes.

If a number of such optical shutters could be integrated into an optical shutter array having a high packing density, then a subtle image would be produced with a high resolving power. Instant efforts to accomplish such an array have encountered several problems, among which important are the following two.

(1) A high driving voltage must be applied in order to increase the contrast of outgoing light.

(2) Wiring is difficult.

These problems will be discussed in detail. The first problem is the neccesity of applying a high driving voltage for increased contrast of outgoing light. It is now assumed that an optical shutter has an electrooptic element sandwiched between a polarizer and an analyzer. When monochromatic light having an intensity $I_0$ and a wavelength of $\lambda$ is incident on the polarizer, the analyzer transmits light having an intensity I represented by the formula:

$$I = I_0 \sin^2\left(\frac{\pi L}{\lambda} \Delta n\right) \quad (1)$$

where L is the thickness of the electrooptic element across which the light passes, that is, an effective length of light path, and $\Delta n$ is birefringence.

If the birefringence is chosen so as to be $\Delta nL = \lambda/2$ in formula (1), then $I = I_0$, that is, the light transmitted by the system has the maximum intensity I. The birefringence $\Delta n$ can be changed by the magnitude of an electric field applied to the element. For example, when the element has a quadratic electrooptic effect, the birefringence $\Delta n$ changes in proportion to the square of an electric field strength E as represented by the following formula:

$$\Delta n = -\tfrac{1}{2}n^3 R E^2 \quad (2)$$

where R is an electrooptic coefficient and n is an index of refraction. Then, the intensity I of the transmitted light is changed from zero to the maximum $I_0$ by applying a rectangular waveform voltage having a magnitude E:

$$E = \left(\frac{\Delta n}{K}\right)^{\frac{1}{2}} = \left(\frac{1}{K} \frac{\lambda}{2L}\right)^{\frac{1}{2}} \quad (3)$$

where $K = -\tfrac{1}{2}n^3 R$.

The voltage V that provides E satisfying formula (3) is called half-wave voltage and designated $V(\tfrac{1}{2})$. The half-wave voltage is correlated to the driving voltage of an optical shutter array.

Therefore, as the electric field strength E is increased, the birefringent $\Delta n$ is increased and hence, the transmitted light intensity I is increased. Also, as the effective length of light path L is increased, the half-wave voltage is lowered so that an increased I is available with a low driving voltage.

With increased I, the contrast of light transmitted by turning on an off of an applied voltage is enhanced. Then, an optical shutter array can be driven with a lower voltage if the effective length of light path is increased.

A prior art optical shutter is illustrated in FIG. 3. Electrodes 4 are formed on an electrooptic material such as PLZT as planar electrodes having a transverse width W by a metallizing or similar technique. In order to increase the effective length of light path L the electrode width W must be increased. However a certain upper limit is imposed on the width W. In order to increase the packing density of an optical shatter array to produce a precise image having a high resolving power, the size of one picture element must be reduced and hence, the electrode width W is required to be 50 $\mu$m or less, and sometimes 5 $\mu$m or less. For this reason, a prior art optical shutter array is designed so as to achieve an increased I by setting a high electric field strength E. Such a higher field strength E leads to a greater energy consumption, leaving many problems in the design of a device. It is said that formula (2) ceases to be true when the field strength E exceeds about 15 to 25 kV/cm.

In order that PLZT optical shutter arrays find a commercial application, the necessary driving voltage must be lowered. Since currently available single shutters have a half-wave voltage $V(\tfrac{1}{2})$ of about 280 V, it is strongly desired that optical shutter arrays have a half-wave voltage $V(\tfrac{1}{2})$ of about 80 V or lower.

For the purpose of lowering the driving voltage, it is proposed to replace the planar electrodes by channel electrodes as shown in FIGS. 4 and 5 (see Japanese Patent Application Kokai No. 58-82221 and Kurita et al., Proceedings of the 1985 Autumn Japan Applied Physics Society Meeting, 44). The term "channel electrode" used herein is an electrode prepared by forming a channel in a transparent substrate of electrooptic material and filling the channel with an electroconductive material.

In the structure of FIG. 4, the channel electrodes 4 are prepared by wet etching a PLZT substrate 3 with a strong acid such as HCl by photolithography. In the structure of FIG. 5, the channel electrodes 30 are prepared by machining channels 19 in a PLZT substrate 3 by means of a dicing saw. In either case, the channel electrodes are intended to increase the effective length of light path L to lower the half-wave voltage V(½).

With respect to these channel electrodes the channels that are formed by wet etching can only have a depth of approximately 10 μm at the maximum. It is almost impossible to form channels to a depth of 50 μm or more by wet etching. The effective length of light path cannot be further increased beyond the limit determined by the maximum channel depth.

Also in the structure of FIG. 5 wherein channels are machined using a dicing saw and a metal such as gold is deposited to form electrodes by sputtering, it is difficult to deposit a sufficient amount of the metal on the wall of the channels if the channels are narrow and deep. As will be demonstrated later by experimental data in Examples, channels having a width of 40 μm resulted in an effective length of light path corresponding to a depth of approximately 20 μm. When the depth of channels exceeds 50 μm at a width of 40 μm, the metal could not be deposited in a sufficient amount to form electrodes. Undesirably, the driving voltage could not be sufficiently lowered.

In both cases of the planar electrodes and the channel electrodes formed by wet etching, since the electrodes are rather present in a surface portion and a relatively high voltage must be applied, the electric field defined between the electrodes is deeply curved in the PLZT substrate 3 as shown by broken lines 11 in FIGS. 3 and 4. When a shutter array is formed with one picture element defined by each pair of electrodes, there is the likelihood of so-called cross-talk that the curved electric field associated with one picture element overlaps the electrodes associated with adjacent picture elements, resulting in a deteriorated SN ratio.

The second problem is the difficulty of wiring.

FIGS. 22 and 23 illustrate the prior art structures of wiring connection of electrodes on an optical shutter array. In the optical shutter array generally designated at 1, a substrate 3 having a plurality of parallel electrodes 4 is attached to a support 2. The support 2 is provided with a corresponding plurality of tapping electrodes 27. The electrodes 4 are connected to the corresponding tapping electrodes 27 through wires 31, respectively.

The process of bonding the wires 31 to the electrodes 4 and 27 is troublesome and time consuming because many connections must be made. There is the risk of disconnection due to probable lack of adherence of wire bonding, also causing a loss of productivity. Particularly when the electrodes 4 are of the channel type, only a narrow area is available on the electrodes for wire bonding so that the wire bonding operation is very difficult.

In the optical shutter array shown in FIG. 23 wherein the longitudinal direction of the electrodes 4 is aligned with the direction of incident light as shown by a solid arrow, the wires 31 connecting the electrodes 4 and the tapping electrodes 27 extend across the light path because of the location of the electrodes relative to the light path. Then, some wires 31 interrupt or scatter the incident light into stray light. The wires 31 have the likelihood of deteriorating the performance of the optical shutter array.

In addition to the first and second problems explained above, integrating a number of optical shutters into an optical shutter array having closely spaced electrodes gives rise to the problem that those portions of the electrodes exposed on the PLZT substrate surface undergo an air discharge upon application of an electric field of about 2 V/μm so that the exposed electrode portions are readily damaged and thus deteriorated during the operation of the shutter array.

SUMMARY OF THE INVENTION

A primary object of the present invention is to provide a novel and improved optical shutter array having electrodes extended deeply in a substrate so that it can be operated with a low driving voltage with a minimized cross-talk between adjacent electrodes.

Another object of the present invention is to provide an optical shutter array in which wires can be readily bonded at a high degree of adherence without the risk of disconnection.

A further object of the present invention is to provide an optical shutter array which is unsusceptible to air discharge and has a long effective life.

A still further object of the present invention is to provide a method for fabricating such an optical shutter array.

A still further object of the present invention is to provide a method for fabricating such an optical shutter array using an electrode wiring technique which mitigates the operation of wiring and reduces the production time, thus improving productivity.

According to a first embodiment of the present invention, there is provided an optical shutter array comprising a transparent substrate formed of a material exhibiting an electrooptic effect, the substrate being provided with at least two parallel extending channels, and electrodes of a conductive resin composition disposed in the channels.

Preferably, the channels are formed by etching or machining.

Preferably, each channel has a depth of at least 50 μm and a transverse distance of 10 to 50 μm.

Preferably, the electrooptic material of which the substrate is formed is a PLZT having 9 atomic percents of La and a molar ratio of $PbZrO_3/PbTiO_3$ of 65/35.

Preferably, the conductive resin composition comprises a base resin selected from a polyimide resin and an epoxy resin, and a filler selected from gold, silver, and copper.

According to a second embodiment of the present invention, there is provided an optical shutter array comprising a transparent substrate formed of a material exhibiting an electrooptic effect, the substrate being provided with at least two parallel extending channels, an electrode of a conductive resin composition disposed in each of the channels, and a pad in electrical contact with at least a portion of the electrode.

Preferably, the pad is a metallic thin film physically or chemically deposited on the electrode portion.

According to a third embodiment of the present invention, there is provided an optical shutter array comprising a transparent substrate formed of a material exhibiting an electrooptic effect, the substrate being provided with at least two parallel extending channels, electrodes of a conductive resin composition disposed in the channels, the electrodes defining a driven portion exhibiting an electrooptic effect in the substrate therebetween, a pad in electrical contact with at least a portion of each the electrode, and a transparent dielectric film formed on the driven portion.

The transparent dielectric film is preferably formed of a compound selected from the group consisting of polyimides, polycarbonates, silicon dioxide $SiO_2$, silicon nitride $Si_3N_4$, and aluminum oxide $Al_2O_3$.

According to a fourth embodiment of the present invention, there is provided a method for fabricating an optical shutter array, comprising the steps of:

forming at least two parallel extending channels in one surface of a transparent substrate of a material exhibiting an electrooptic effect, applying a conductive resin composition to the channeled substrate surface in an excessive amount to fill the channels therewith, and abrading the surface to provide a smooth surface.

According to a fifth embodiment of the present invention, there is provided a method for fabricating an optical shutter array, comprising the steps of:

forming at least two parallel extending channels in one surface of a transparent substrate of a material exhibiting an electrooptic effect, applying a conductive resin composition to the channeled substrate surface in an excessive amount to fill the channels therewith, and abrading the surface to provide a smooth surface, the remaining portions of the resin composition filled in the channels constituting electrodes of the array, placing an anisotropic conductive connector on the substrate surface, placing a flexible printed wiring connector to overlap the anisotropic conductive connector such that conductors of the flexible printed wiring connector are in register with the electrodes in the substrate, and press holding the anisotropic conductive connector and the flexible printed wiring connector to the substrate by fastening means, thereby achieving electrical connection between the electrodes in the substrate and the conductors of the flexible printed wiring connector via the anisotropic conductive connector.

The fastening means includes a press bar or plate.

BRIEF DESCRIPTION OF THE DRAWINGS

The above and other objects, features, and advantages of the present invention will be more fully understood from the following description when taken in conjunction with the accompanying drawings, in which:

FIG. 9b is a cross section of the array taken along lines I—I in FIG. 9a;

FIG. 10b is a cross section of the array taken along lines II—II in FIG. 10a;

FIG. 11a is a plan view of an optical shutter array having a transparent dielectric film over the entire surface except contact holes according to the third embodiment of the present invention;

FIG. 11b is a cross section of the array taken along lines III—III in FIG. 11a;

FIGS. 17a to 17d illustrate steps of fabricating an optical shutter array by an electrode wiring method according to the fifth embodiment;

DETAILED DESCRIPTION OF THE INVENTION

Figure 1:
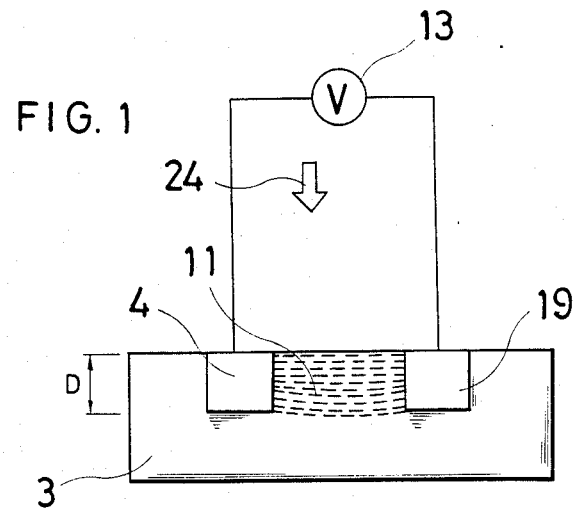
FIG. 1 is a schematic illustration of an optical shutter array according to the first embodiment of the present invention.

Referring to FIG. 1, there is illustrated an optical shutter array according to the first embodiment of the present invention as comprising a substrate 3 formed of a transparent electrooptic material and at least two channel electrodes 4. The channel electrodes 4 are prepared by forming parallel, equally spaced channels 19 in one major surface of the substrate 3 and filling the channels with an electroconductive resin composition. Each channel 19 has a depth of at least 50 $\mu$m in a direction perpendicular to the substrate surface and a transverse width of 10-50 $\mu$m. The width of the channels 19 may be at least twice greater the particle size of filler particles in the conductive resin composition for the purpose of filling the composition, but be as narrow as possible for the purpose of minimizing the size of one picture element (12-1, 12-2 in FIG. 7) in the optical shutter array.

The channels 19 are filled with the electroconductive resin composition. Any desired conductive resin compositions may be used although preferred are compositions comprising polyimide and epoxy resins and fillers of silver (Ag), gold (Au), and copper (Cu).

The most preferred electrooptic material of which the substrate is made is a transparent ceramic PLZT having a composition of 9/65/35, that is, 9 atomic percents of La and a molar ratio of $PbZrO_3/PbTiO_3$ of 65/35.

Also useful are PLZT materials having a composition of 7/65/35, 8/65/35, 8/40/60, 12/40/60, and 10/65/35, PBLN materials having a composition of 60/2 and 70/8, a PLHT material having a composition of 10/65/35, PBLN materials having a composition of 4/60/40 and 8/60/40, SBN, $LiTaO_3$, $LiNbO_3$, $KH_2PO_4$, $KD_2PO_4$, BBN, and KTN.

Among the electrooptic materials, there are included the materials exhibiting linear electrooptic effect or Pockels effect wherein induced refractive index changes are proportional to the first power of an electric field strength and the materials exhibiting quadratic electrooptic effect or Kerr effect wherein induced refractive index changes are proportional to the second power of an electric field strength. Either of them may be used herein, but the latter is preferred.

A method for fabricating an optical shutter array according to the fourth embodiment will be described by referring to FIG. 2.

Figure 2A:
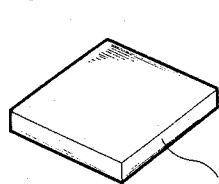
FIGS. 2a to 2g illustrate steps of fabricating an optical shutter array according to the present method.
Figure 2B:
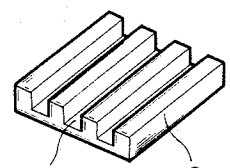
Figure 2C:
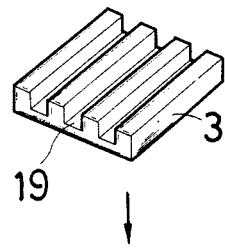

The starting material is a substrate 3 having a pair of opposed flat major surfaces as shown in FIG. 2a. The substrate 3 is formed on one major surface with a plurality of channels 19 as shown in FIG. 2b. The channels 19 may be formed by wet etching of the substrate with a strong acid such as HCl, but preferably by machining using a dicing saw or similar cutting tool or dry etching. Channels having a transverse width of 10 to 50 μm and a depth of at least 50 μm may be readily formed by machining. After the machining, the substrate is annealed to remove working strains as shown in FIG. 2c.

Figure 2F:
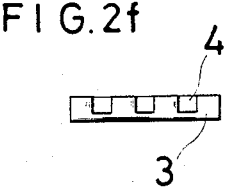
Figure 2E:
Figure 2D:
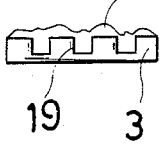

The channels 19 are then filled with a conductive resin composition 5. This filling is made by applying the conductive resin composition to the channeled surface in an amount in excess of the combined volume of the channels as shown in FIG. 2d. The overflowing amount of conductive resin composition 5 applied to the channels is cured by heating or other hardening techniques as shown in FIG. 2e. Thereafter, the top surface of the substrate 3 is abraded away to remove the excess of conductive resin composition to provide a smooth surface under which parallel electrodes 4 are regularly and deeply inset contiguous to the surface, as shown in FIG. 2f.

The term dry etching used herein is intended to include sputter etching processes using ion beam, inert gas, and reactive gas. As opposed to wet etching using solution, physical etching using ionized particles accelerated in plasma is designated sputter etching. There are included physical sputter etching using an inert gas such as argon, reactive sputter etching using a reactive gas, and ion beam etching using an ion beam.

Figure 12:
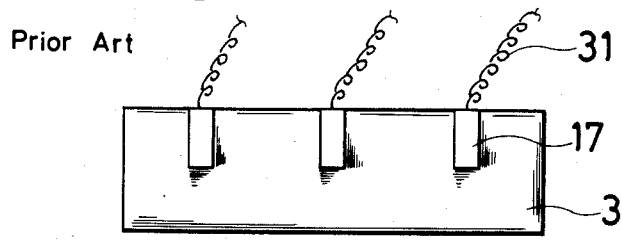
FIG. 12 is a cross section showing the electrode structure of a prior art optical shutter array.

The channel fill type electrodes thus prepared by filling the channels 19 with the conductive resin composition 5 encounter difficulty in wiring because only a small area is available for wire bonding (see FIG. 12). The difficulty of wiring is obviated by the second, third, and fifth embodiments of the present invention in a manner as described below.

Figure 9A:
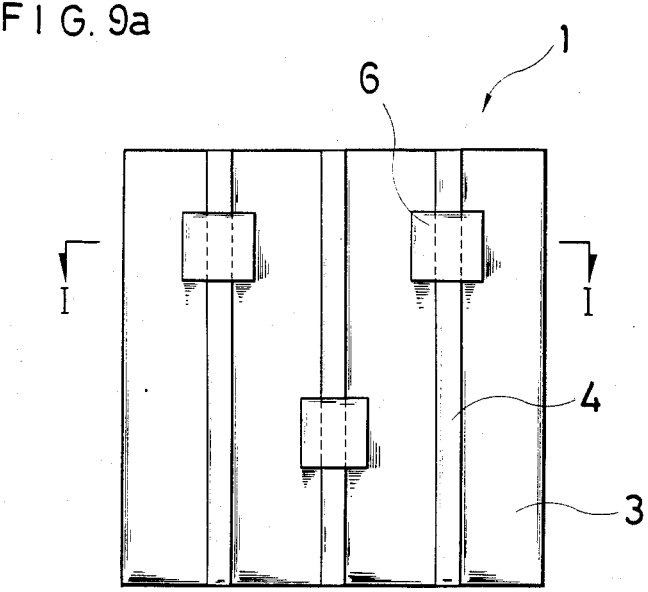
FIG. 9a is a plan view of an optical shutter array having electrode pads according to the second embodiment of the present invention.
Figure 9B:
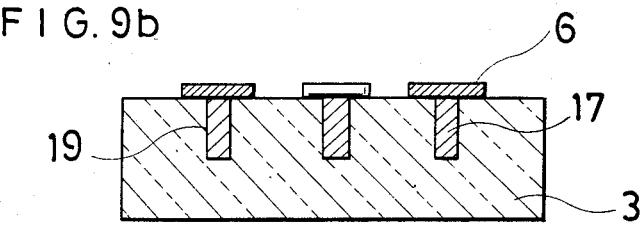

FIG. 9 illustrates the construction of an optical shutter array 1 having electrode pads 6 according to the second embodiment of the present invention. FIG. 9a is a plan view and FIG. 9b is a cross section taken along lines I—I in FIG. 9a. In this embodiment, the channel fill type electrode portions 17 are prepared by forming channels 19 in a transparent substrate 3 of electrooptic material and filling the channels with a conductive resin composition by a procedure as shown in FIG. 2.

Pads 6 are disposed on the surface of the substrate 3 in electrical contact with the electrodes 4. Each pad 6 is a thin plate-like piece preferably having a size of at least 150 μm by 150 μm and consisting of a single or plural layers of conductive material such as Ag, Au, Cu, Al, Cr and other metals. The pads 6 may be prepared by forming a metal thin film (like a pad layer 18 in FIG. 13a) by any metallizing techniques such as evaporation and sputtering. A photoresist is applied thereon by means of a spinner or the like, and a desired pad pattern is defined in the photoresist. The metal thin film is etched with a suitable etching solution such as aqua regia except the masked metal portions. The photoresist mask is finally removed to leave the pads, completing the structure.

The following construction is useful in overcoming the problem that electrodes closely arranged for high density integration tend to be damaged by an electric discharge therebetween.

Figure 10A:
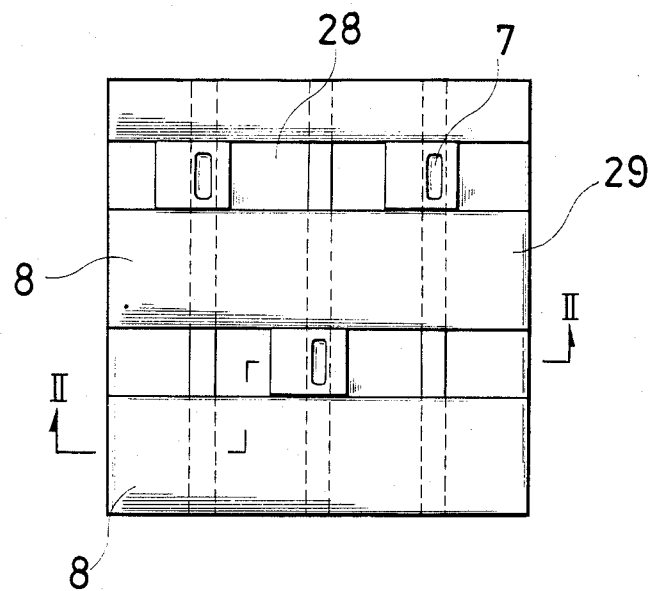
FIG. 10a is a plan view of an optical shutter array having a transparent dielectric film on at least a driven portion according to the third embodiment of the present invention.
Figure 10B:
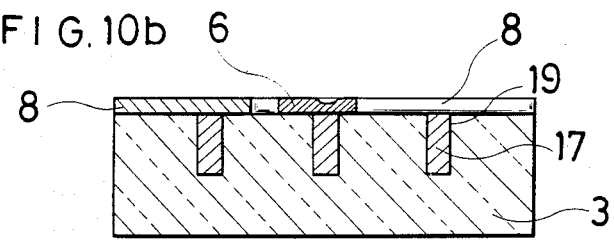

FIG. 10 illustrates the construction of an optical shutter array having a transparent dielectric film on at least a driven portion according to the third embodiment of the present invention. FIG. 10a is a plan view and FIG. 10b is a cross section taken along lines II—II in FIG. 10a.

In this embodiment, a transparent substrate 3 of electrooptic material is provided on the surface with a transparent dielectric film 8 on at least a driven portion 29 except contact holes 7. The contact holes 7 are those portions of the ill electrode portions 17 thar are exposed on the substrate surface and still left exposed for electrical connection to the electrode pads 6 without being covered with the dielectric film 8.

The contact holes 7 may be left exposed by any suitable techniques such as photolithography. The photolithography includes applying a photoresist on a transparent dielectric film 8, defining a contact hole pattern in the photoresist, and etching away the exposed portions of the dielectric film 8 to define the contact holes 7.

The electrode pads 6 are disposed on the substrate surface and within the contact holes 7 so as to cover the fill electrode portions 17 of the electrodes 4 and electrically connected to the electrodes 4.

The transparent dielectric film 8 is disposed on at least the driven portion 29 of the substrate 3. The driven portions 29 are those portions of the PLZT substrate where an electric field is actually applied and light passes. An electrode portion 28 is to electrically connect the optical shutter array to another device.

The transparent dielectric film 8 may be disposed on at least the driven portion 29 of the substrate 3, and it may be either present on the electrode portion 28 as shown in FIG. 11 or absent as shown in FIG. 10. That portion of the dielectric film which is disposed outside the driven portion 29 need not be transparent. For example, a light-shielding film may be disposed below the pads 6 so that unnecessary light transmission and polarization may be avoided in the corresponding portion of the electrooptic substrate 3.

The transparent dielectric film 8 may be formed from organic compounds such as polyimides and polycarbonates and inorganic compounds such as silicon oxide $SiO_2$, silicon nitride $Si_3N_4$, and aluminum oxide $Al_2O_3$.

The light-shielding dielectric film may be formed from coal tar pitch and similar materials.

The dielectric film may be formed by spinner coating in the case of organic compounds and by evaporation, sputtering and chemical vapor deposition (CVD) in the case of inorganic compounds.

With respect to the position of the pads 6 relative to the electrodes 4, the pads 6 may be arranged in any positions, but preferably alternately staggered as shown in FIGS. 9a, 10a, and 11a so that they may have as large an area as possible without contact between adjacent ones. An oblique arrangement may also be employed.

Next, methods for fabricating an optical shutter array having electrode pads according to the second embodiment and an optical shutter array having a transparent dielectric film according to the third embodiment are described by referring to FIGS. 13 and 14.

Formation of the electrode 4 in the transparent substrate 3 of electrooptic material is the same as in the previously described method for fabricating an array according to the first embodiment.

Figure 13A:
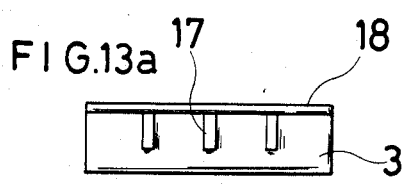
FIGS. 13a to 13b illustrate steps of fabricating an optical shutter array according to the second embodiment.
Figure 13B:
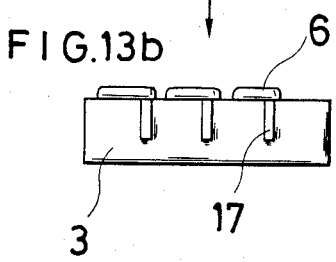

An optical shutter array having electrode pads, but free of a dielectric film may be prepared by forming a metal layer 18 on the substrate 3 having the fill electrode portions 17 already inset therein as shown in FIG. 13a. The layer 18 may have a structure consisting of two layers of Au and Cr or a single layer of Al. The layer 18 may be formed by sputtering or evaporation. Then the layer 18 is selectively removed by photolithography using a positive resist HPR 504 (manufactured by Hunt Co.), for example, leaving the pads 6 as shown in FIG. 13b.

Figure 14A:
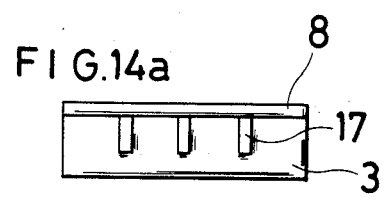
FIGS. 14a to 14d illustrate steps of fabricating an optical shutter array according to the third embodiment.
Figure 14B:
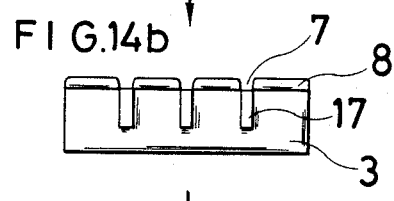
Figure 14C:
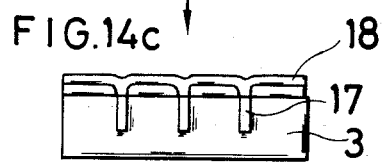
Figure 14D:
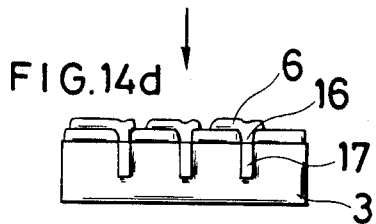

An optical shutter array having a dielectric film may be prepared by forming a transparent dielectric film 8 on the substrate 3 having the fill electrode portions 17 already inset therein as shown in FIG. 14a. Preferably, a polyimide composition is spinner coated. Contact holes 7 are opened in the dielectric film 8 at positions corresponding to the fill electrode portions 17 as shown in FIG. 14b by photolithography wherein the dielectric film is etched using a photoresist mask. A metal layer 18 is formed over the dielectric film 8 as shown in FIG. 14c. The metal layer 18 may be the same as that described in the previous embodiment with respect to application and structure. The difference is that the metal is also applied in the contact holes 7 and these portions subsequently serve as connecting electrode portions. Then the layer 18 is selectively removed by photolithography in a similar manner, leaving the pads 6 as shown in FIG. 14d. The fill electrode portions 17 are in electrical connection to the pads 6 through the connecting electrode portions disposed within the contact holes 7 in the dielectric film 8.

The present invention also provides an optical shutter array fabricating method using an electrode wire bonding technique as described below in order to overcome the difficulty of wire bonding to channel fill electrodes.

The method for fabricating an optical shutter array using an electrode wire bonding technique according to the fifth embodiment of the present invention is described by referring to FIG. 17.

These are prepared a transparent substrate 3 of electrooptic material having electrodes 4 already buried therein and a support 2 having tapping electrode or strips 27 already formed in register with the optical shutter electrodes 4 by any appropriate method. A first step is to adhesively attach the substrate 3 to the upper surface of the support 2.

Figure 18:
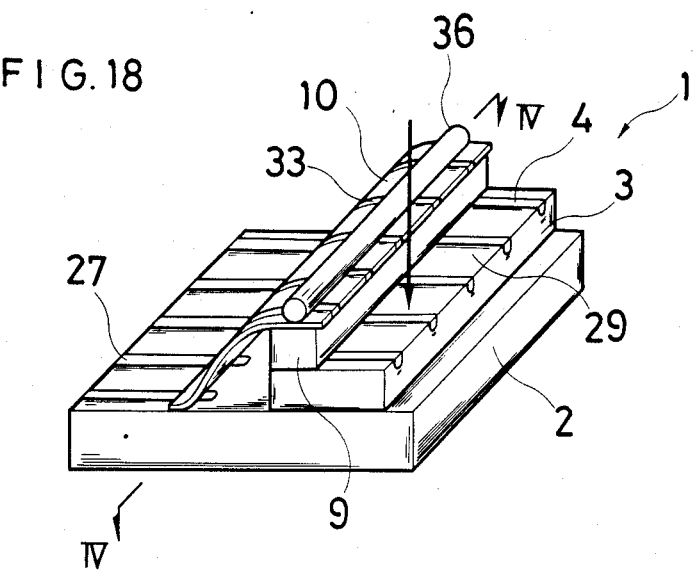
FIG. 18 is a perspective view illustrating the wiring structure of an optical shutter array according to the fifth embodiment.

In the case of an optical shutter array of the structure shown in FIG. 18 wherein incident light passes across the support 2, the support 2 may preferably be a substantially transparent plate and bonded to the substrate with an optical adhesive.

Figure 21:
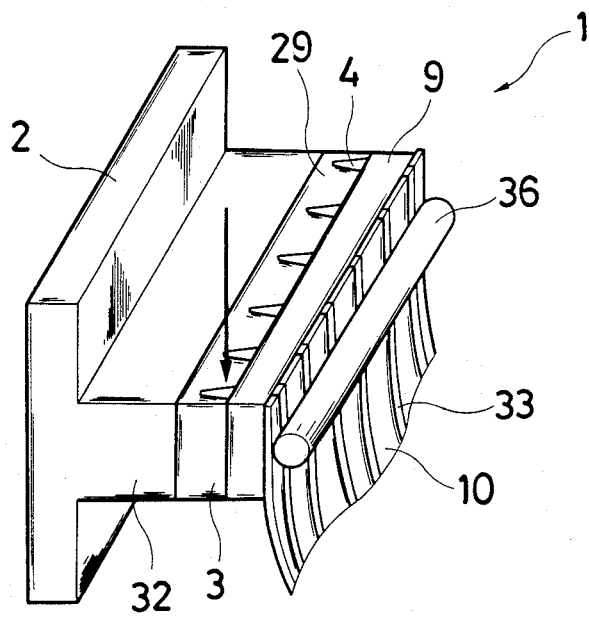
FIG. 21 is a perspective view illustrating the wiring structure of another optical shutter array according to the fifth embodiment.
Figure 22:
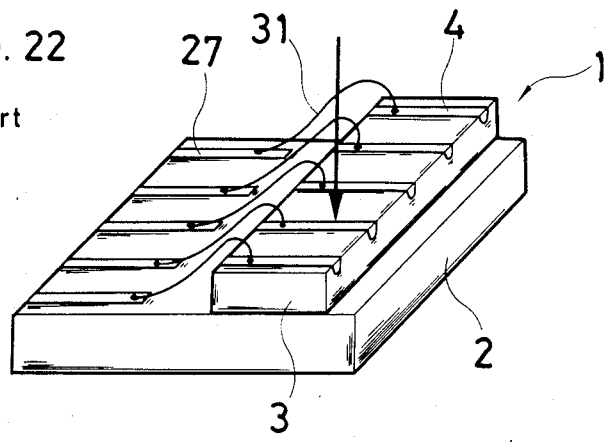
FIGS. 22 and 23 are perspective views illustrating the wiring structure of prior art optical shutter arrays.
Figure 23:
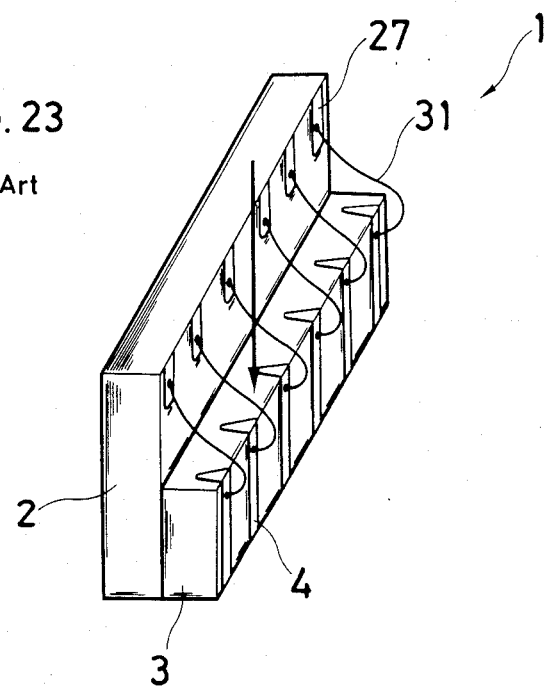

In an optical shutter array of the structure shown in FIG. 21 wherein the support 2 of an inverted T shape has a stand 32 and the substrate 3 is bonded to the top end of the stand 32, incident light does not pass across the support 2. The support 2 may be either transparent or opaque and the adhesive used may be conventional one without being limited to optical one.

The support 2 may be formed from any desired materials such as ceramic materials. Preferably glass and saphire may be used when the support 2 should be a transparent structure.

The transparent substrate 3 of electrooptic material has electrodes 4 formed in parallel and equal spacings. A driven portion 29 is defined in the substrate by the adjacent two electrodes 4. The driven portion 29 exerts an electrooptic effect when voltage is applied across the electrodes 4.

Figure 17A:
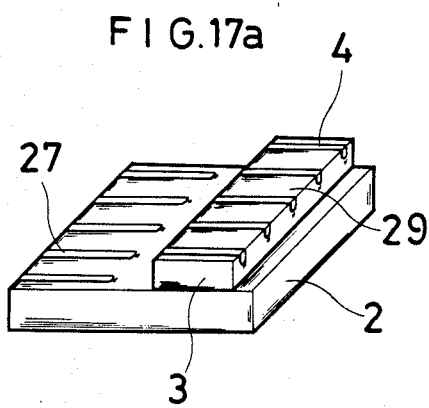
Figure 17B:
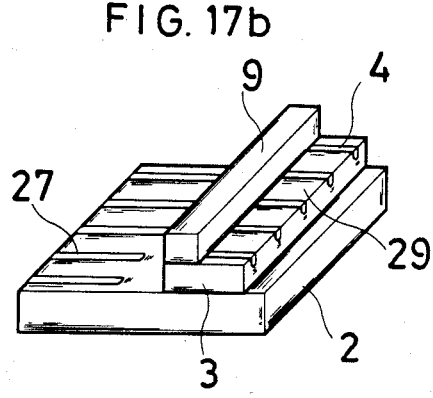

A second step is to place an anisotropic conductive connector 9 on the substrate 3 as shown in FIG. 17b such that the connector is electrically connected to the electrodes 4 as described below. Placement of the connector 9 does not require accurate alignment because of the nature of the connector as will become apparent from the following description.

Figure 19:
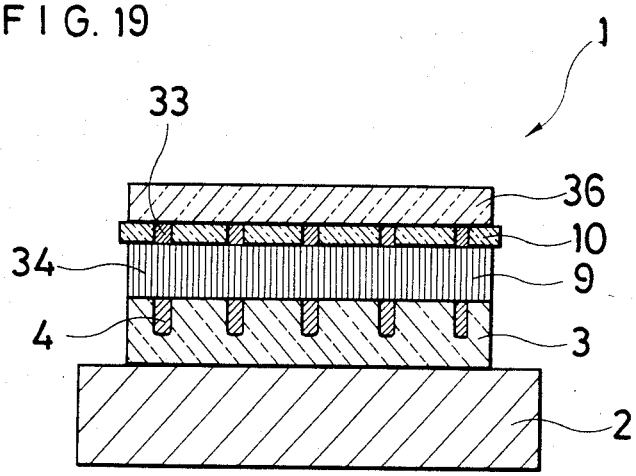
FIG. 19 is a cross section of the wiring structure taken along lines IV—IV in FIG. 18.
Figure 20:
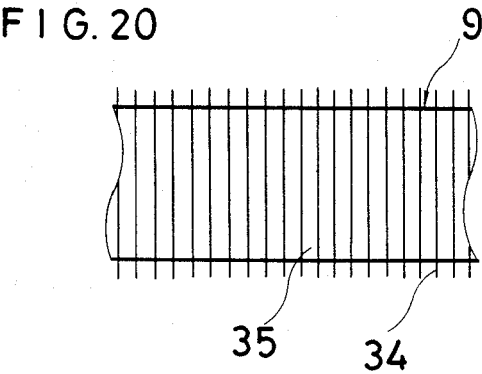
FIG. 20 is an elevational illustration of an anisotropic conductive connector used in the present invention.

The anisotropic conductive connector 9 has a structure wherein a plurality of fine wires 34 of a metal such as Au are regularly arranged in a predetermined direction in an elastic dielectric material 35 such as silicone rubber as shown in FIGS. 19 and 20. The opposite ends of the metal wires are extended about 10 to 20 $\mu$m beyond the opposite sides of the dielectric material 35. The extensions of the metal wires on one side are in electrical contact with the electrodes 4 and those on the other side are in electrical contact with conductors 33 of a FPC 10 to be described later, thereby achieving electrical connection between the electrodes 4 and the conductors 33. The close regular arrangement of metal wires 34 provides electrical connection by simply placing the anisotropic conductive connector 9 on the substrate 3 without accurate alignment, thereby mitigating the trouble of wiring operation.

Figure 17C:
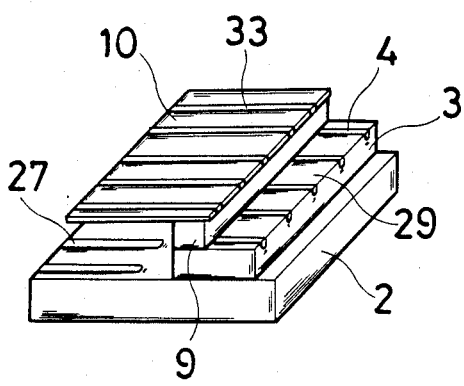
Figure 17B:
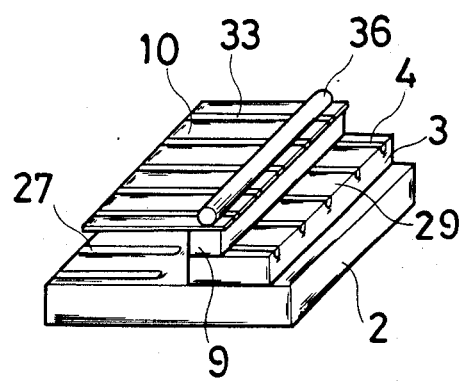

A third step is to place a flexible printed wiring connector (to be abbrreviated as FPC) 10 so that one end portion thereof rests on the anisotropic conductive connector 9 as shown in FIG. 17c.

The FPC 10 has a plurality of conductors 33 formed in parallel and at a spacing equal to that between electrodes 4. The FPC 10 is positioned such that the conductors 33 are electrically connected to tne corresponding electrodes 4 through the metal wires 34 of the anisotropic conductive connector 9. The FPC 10 is formed from a flexible resin such as Kapton, preferably having insulating properties because the conductors 33 are extended thereon. The conductors 33 may be formed by sputtering or evaporating a metal such as Cu and Au.

A fourth step is to compression retain the anisotropic conductive connector 9 and the FPC 10 to the substrate 3 by fastening means including a press bar 36. This step ensures more positive firm electrical connection between the electrodes 4 and the conductors 33 as compared with conventional wire bonding.

One example of the compression fastening means uses a press bar 36 of an insulating material having a polygonal or circular column shape which is fixedly secured to the substrate 3 or the support 2 by means of a suitable fastener.

The compression fastening and hence, electrical connection of the FPC 10 to the anisotropic conductive connector 9 by means of the press bar 36 is readily and positively accomplished, simplifying the step of wire connection to diminish the labor spent in the manufacture of an optical shutter array.

Compression fastening may also be achieved without using the press bar 36, for example, by using a press plate. Namely, a glass plate is opposed to the support 2 so as to sandwich the FPC 10, the anisotropic conductive connector 9, and the substrate 3 therebetween.

A fifth step is to bend a free end portion of the FPC 10 downward to connect the conductors 33 thereon to the corresponding strips 27 on the support 2 as shown in FIG. 18. Connection of the conductors 33 to the strips 27 may be by press bonding, heat sealing or the like.

In the optical shutter array of the structure shown in FIG. 18, the FPC 10 is located where a path of incident light indicated by a solid arrow is not disturbed. On the contrary, the optical shutter array of the structure shown in FIG. 21 should not utilize the arrangement wherein the support 2 is provided with tapping strips to which a free end of the FPC 10 is connected, because the FPC 10 disturbs the path of incident light. It is thus necessary to connect a free end on the FPC 10 to tapping strips provided on another desired location. Because of its flexibility, the FPC 10 can be readily connected to the tapping strips irrespective of their location.

OPERATION

The operation of the optical shutter array according to the present invention will be described.

Figure 8:
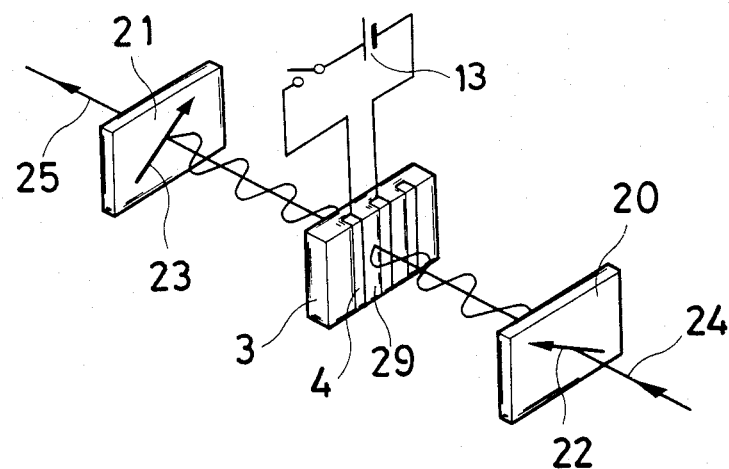
FIG. 8 illustrates the operation of an optical shutter array.

As shown in FIG. 8, an optical shutter array according to the first embodiment of the present invention is placed in a path of light shown by a solid arrow. A pair of electrodes 4 inset in the substrate 3 are connected to positive and negative terminals of a power supply 13. A polarizer 20 and an analyzer 21 are located on the entrance and exit sides of the optical shutter array, respectively, while they are opposed to each other and directed in parallel. The polarizer 20 has a plane of polarization in one direction shown by an arrow 22 whereas the analyzer 21 has a plane of polarization in a perpendicular direction shown by an arrow 23.

Incident light 24 in the form of a flux of parallel rays enters the polarizer 20. The incident light flux has natural polarization. The light is linearly polarized by the polarizer 20 so that the parallel ray flux transmitted by the polarizer 20 is linearly polarized light having a plane of polarization in the direction 22.

The linearly polarized parallel ray flux passes across the driven portion 29 of the optical shutter array where the transmitted light undergoes no change of polarization when no voltage is applied to the associated electrodes. The light transmitted by the array without changing its polarization reaches the analyzer 21 and is interrupted thereby because the polarized direction of the incoming light is perpendicular to the direction 23 of the polarization plane of the analyzer 21. This means that the system is normally closed.

When a voltage is applied across the associated electrodes of the optical shutter array, an electric field acts on the driven portion 29 to exert an electrooptic effect. The electrooptic effect induces a phase shift between ordinary and extraordinary rays so that the light transmitted by this region becomes elliptically polarized light. The elliptically polarized light contains a polarized component having a polarization direction shown by an arrow 23, which component is transmitted by the analyzer 21 to produce outgoing light 25.

Unlike the embodiment shown in FIG. 8, the polarizer 20 and the analyzer 21 may be opposed parallel and oriented such that their planes of polarization may have the same direction. In this case, the light transmitted by the optical shutter array having a voltage applied to its electrodes is interrupted by the analyzer 21 whereas the transmitted light can pass through the analyzer 21 when no voltage is applied to the array electrodes. This provides a normally open system.

In this way, the transmission and interruption of light by the optical shutter array can be controlled by turning on and off the voltage applied to the array electrodes. It is also possible to control the intensity of transmitted light by controlling the applied voltage.

Figure 3:
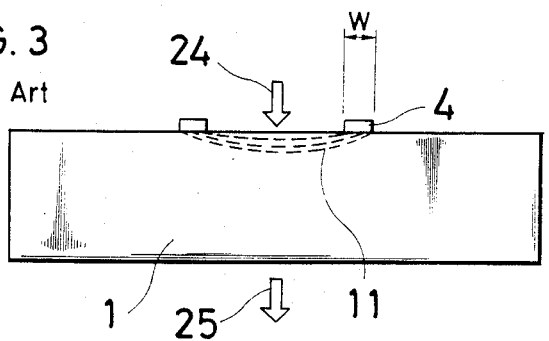
FIG. 3 is a schematic cross section of a prior art structure having planar electrodes.
Figure 4:
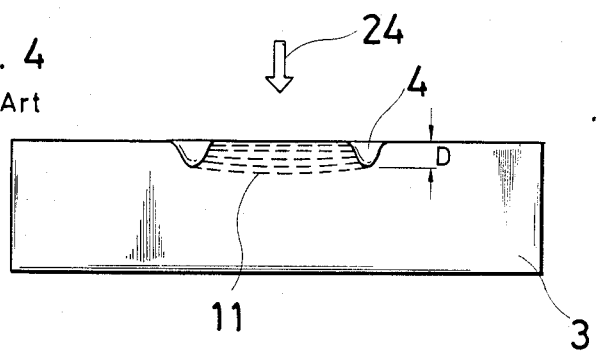
FIG. 4 is a schematic cross section of a prior art structure having channel electrodes formed by etching.
Figure 5:
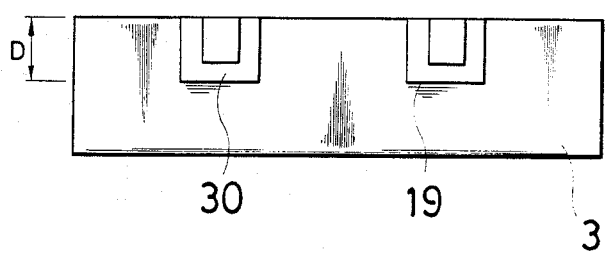
FIG. 5 is a schematic cross section of a prior art structure having channel electrodes formed by metal sputtering.

Although a prior art optical shutter array having planar electrode as shown in FIG. 3 has the possibility of cross-talk between contiguous picture elements because of the creeping electric field 11, the optical shutter array of the present invention has minimized the cross-talk between contiguous picture elements because the electrodes are formed by filling relatively deep channels reaching the bulk of the substrate with a conductive resin so tnat the electric field linearly extends even in the deep region of the substrate. As the channels become deeper, the optical shutter has a greater effective length of light path so that it can be driven with a lower voltage. The electrodes disposed in the deep channels have an additional function of reinforcing the substrate.

The electrodes 4 formed in channels are electrically connected to another device by wire bonding. Such wire bonding was difficult in the prior art. The second embodiment of the present invention facilitates and ensures wire bonding because the electrodes have formed thereon pads having a relatively large surface area.

The third embodiment of the present invention wherein a transparent dielectric film covers at least the surface of a driven portion has several advantages including eliminated danger of electrodes undergoing an air discharge and resistance to abrasion during use, and controlled cross-talk between pads and between a pad and an adjacent electrode.

The fifth embodiment of the present invention has the advantage that electrical connection can be achieved simply by press holding an anisotropic conductive connector and an FPC on a substrate.

The optical shutter array of the present invention may find an application in hard copy printers, for example.

EXAMPLES

In order that those skilled in the art will better understand the practice of the present invention, examples are presented below by way of illustration and not by way of limitation.

EXAMPLE 1

A PLZT wafer commercially available from Motrola Co. (composition 9/65/35, size 0.3 mm thick×2 inch diameter) was diced into PLZT chips of 10 mm×10 mm×0.3 mm by means of a dicing saw of Type DAD-2H/6 (manufactured by DISCO Co., blade NBC-Z1060, 50.8 mm×0.035 mm×40 mm, flange PS4924, 30,000 revolutions/minute, cutting speed 2 mm/sec.). Each PLZT chip was formed with 30 parallel channels having a transverse width of 40 $\mu$m and a depth of 50 $\mu$m at a pitch of 100 $\mu$m by means of the same dicing saw, the channels having a depth direction perpendicular to the chip surface. The channeled chips were placed in an electric furnace where a heat treatment was carried out in air at 500° C. for 5 hours for strain removal.

The chips were removed and the chip channels were then filled with an excess amount of a conductive adhesive, Lex Bond T-700 (manufactured by Muromachi Chemical K.K.) so that the adhesive overflowed beyond the channels. The chips were again placed in the oven where they were heated in air at 100° C. for 2 hours to harden the adhesive. Using a polishing machine Type ML-150 (manufactured by Maruto Co.), the chips were polished on their surface to abrade away the excess of adhesive, obtaining PLZT optical shutter arrays having a smooth surface.

Figure 2G:
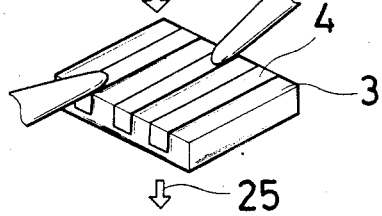
Figure 6:
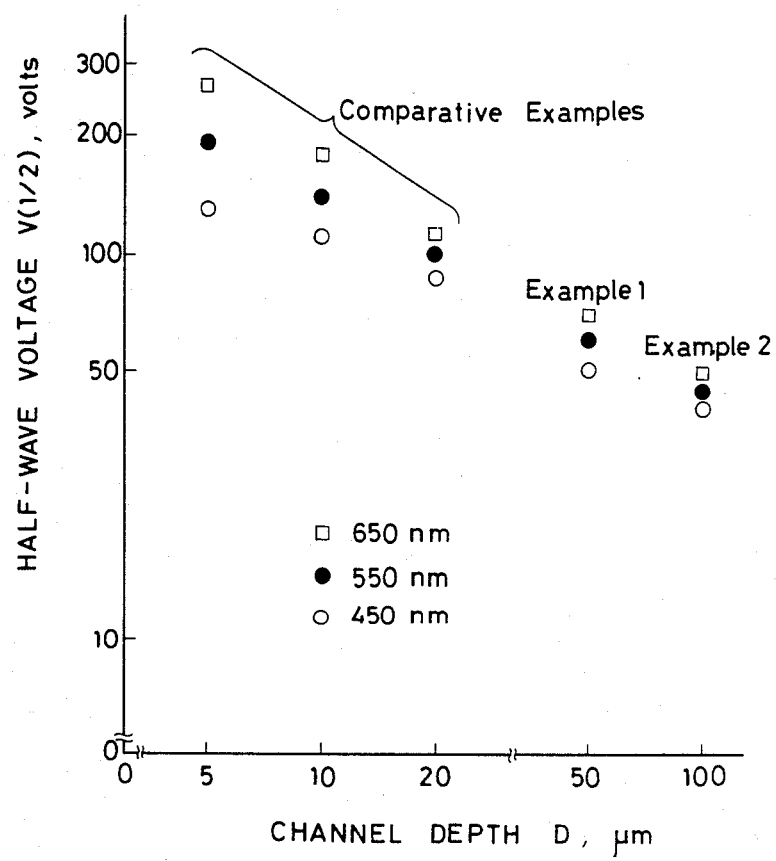
FIG. 6 is a graph showing the half-wave voltage of arrays of Examples 1-2 and Comparative Examples as a function of channel depth.

The resulting optical shutter array was operated as a shutter by applying a DC voltage to its electrodes via a wafer prober (manufactured by Nihon Micronics K.K.) and directing light having a wavelength of 650, 550, and 450 nm. More particularly, probes 15 are brought in contact with adjacent electrodes as shown in FIG. 2g. The array displayed a half-wave voltage as reported in Table 1. FIG. 6 is a graph in which the data of Table 1 are plotted.

EXAMPLE 2

Optical shutter arrays were prepared by repeating the same procedure as in Example 1 except that the channels had a depth of 100 $\mu$m in a direction perpendicular to the chip surface. They were measured for half-wave voltage by the same procedure as in Example 1. The results are reported in Table 1 and diagrammatically drawn in the graph of FIG. 6.

EXAMPLE 3

Figure 7:
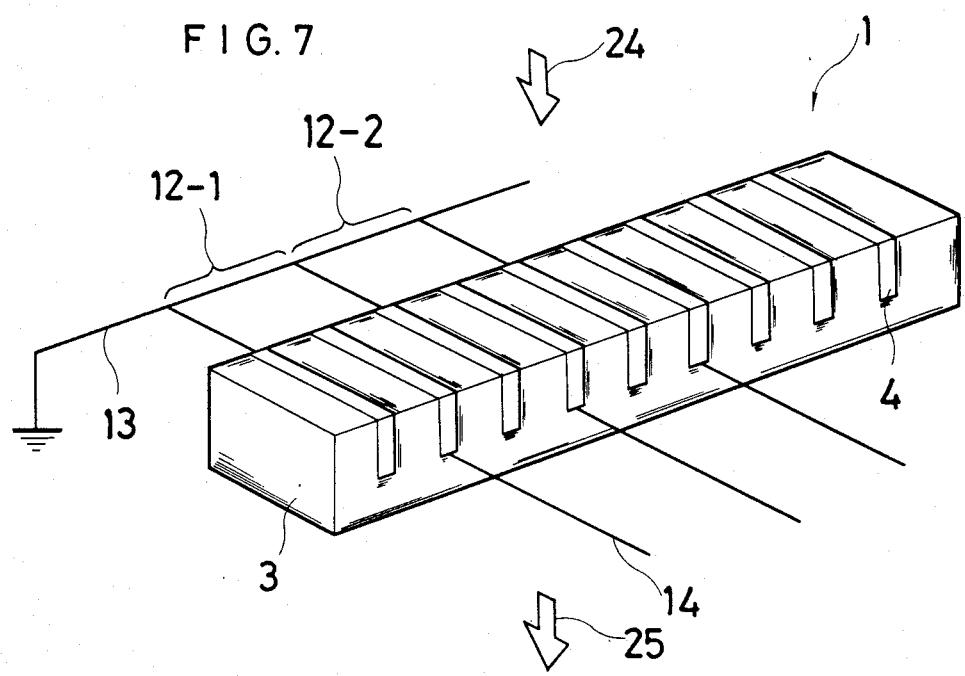
FIG. 7 is a perspective view of one example of the optical shutter array according to the present invention.

Substantially following the procedure of Example 1, an optical shutter array having picture elements 12-1, 12-2, . . . as shown in FIG. 7 was manufactured by starting with a PLZT substrate of 30 mm long×3,000 $\mu$m wide×300 $\mu$m thick and forming parallel channels having a width of 20 $\mu$m and a depth of 100 $\mu$m at a pitch of 50 $\mu$m. The array was operated in an optical shutter mode to find that a clear image was produced with minimal cross-talk.

It is thought that the channel electrodes 4 formed perpendicular to the surface of the substrate 3 as shown in FIG. 1 extend a less warped electric field 11 therebetween and can be driven with a lower power, as compared with the conventional ones as shown in FIG. 3. The electric field defined between electrodes creeps to a lesser extent from one picture element 12-1 to a next picture element 12-2, thus preventing the cross-talk between the two adjacent picture elements 12-1 and 12-2.

COMPARATIVE EXAMPLES

For comparison purposes, PLZT chips were machined with channels having a width of 40 $\mu$m at a pitch of 100 $\mu$m in a similar manner as in Example 1 while the channel depth was varied to 5, 10, 20, 50, and 100 $\mu$m. Metallic chromium was first sputtered to form a lower Cr layer of 250 Å thick and metallic gold was then sputtered to form an upper Au layer of 10,000 Å thick. For the channels having a depth of 50 and 100 $\mu$m, the sputtered film could not firmly adhere to the channel wall.

The arrays having a channel depth of 5, 10, and 20 $\mu$m were measured for half-wave voltage at varying wavelengths by the same procedure as in Example 1. The results are reported in Table 1 and diagrammatically plotted in the graph of FIG. 6.

It is evident that metal sputtering can form effective electrodes in channels only when the channels have a limited depth of less than 50 $\mu$m.

On the contrary, by filling channels with a conductive resin according to the present invention, the electrodes can be formed to the same depth as channel machining even when the channels are as deep as 50 $\mu$m or more. The deeply inset electrodes exhibit a very low half-wave voltage and a low driving voltage.

TABLE 1

Electrode Channel Depth vs. Half-Wave Voltage

| | Comparative Example | | | Example 1 | Example 2 |
|---|---|---|---|---|---|
| Channel depth | 5 $\mu$m | 10 $\mu$m | 20 $\mu$m | 50 $\mu$m | 100 $\mu$m |
| Wave length | | | | | |
| 450 nm | 130 V | 110 V | 80 V | 50 V | 40 V |
| 550 nm | 190 V | 140 V | 100 V | 60 V | 45 V |
| 650 nm | 260 V | 180 V | 120 V | 70 V | 50 V |

EXAMPLE 4

A PLZT substrate having a composition of 9/65/35 and a size of 30 mm long×3,000 $\mu$m wide×300 $\mu$m thick was machined with 119 parallel channels having a width of 35 $\mu$m, length of 3,000 $\mu$m, and a depth of 200 $\mu$m by means of a dicing saw. The channels were filled with a conductive resin compound, Lex Bond T-700 (manufactured by Muromachi Chemical K.K.) to form electrodes. Pads of 100 $\mu$m×200 $\mu$m were then formed on the surface of the PLZT substrate at locations on the electrodes by sputtering of Au/Cr double layers followed by photolithographic etching.

Figure 15:
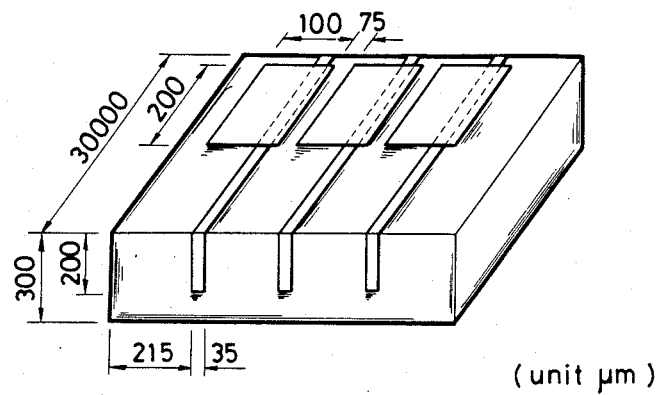
FIG. 15 is a perspective view illustrating a dielectric layer-free optical shutter array prepared in Example 4.

There was obtained an optical shutter array as shown in FIG. 15 in which all numerals designate dimensions as expressed in $\mu$m.

The electrodes pads applied could have a relatively large surface area of 100×200 $\mu$m, which is available for wire bonding. Wire bonding was performed on the pads to find that such large area pads faciliated positive wire bonding free of the risk of disconnection.

EXAMPLE 5

By following substantially the same procedure as in Example 4, a similar PLZT substrate was machined with channels of similar dimensions by means of a dicing saw and the channels were filled with a similar conductive resin compound to form electrodes. Thereafter, pads similar to those of Example 4 were formed on the PLZT substrate at locations of the electrodes by coating the substrate with a polyimide resin to a thickness of about 1.5 μm, applying a photoresist on the polyimide film, patterning contact holes in the photoresist, etching away the exposed polyimide resin with a suitable etching solution, removing the photoresist, and sputtering silver followed by photolithographic defining.

Figure 16:
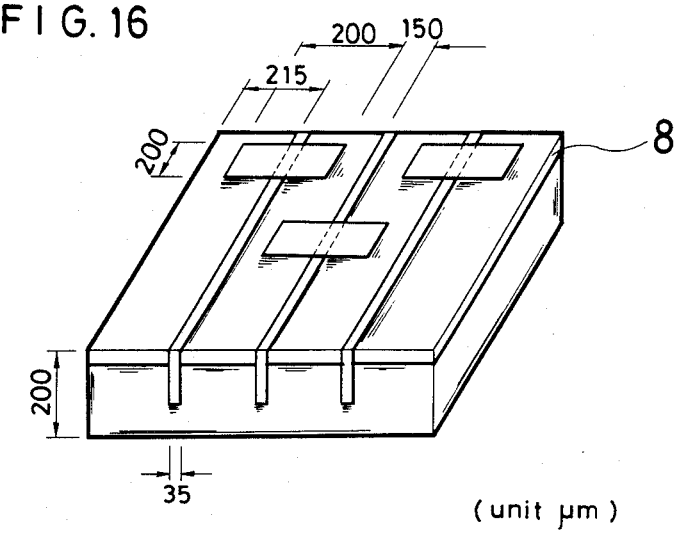
FIG. 16 is a perspective view illustrating a dielectric layer-covered optical shutter array prepared in Example 5.

There was obtained an optical shutter array as shown in FIG. 16 in which all numerals designate dimensions as expressed in μm.

The staggered arrangement of electrode pads allows each pad to be enlarged to dimensions of 200×200 μm while leaving a full distance between the pads, ensuring the production of a clear image with minimal cross-talk.

This optical shutter array was measured for dielectric properties. As measured at the narrowest spacing between electrodes in the electrode arrangement, that is, electrode-to-pad spacing, no breakdown due to electric discharge occurred even at a field strength of 40 V/μm. It was demonstrated that the third embodiment of the present invention is fully effective. A desirably high dielectric property was observed as compared with a conventional optical shutter array free of a dielectric film giving rise to an air discharge at a low field strength of about 2 V/μm.

EFFECT OF THE INVENTION

In the optical shutter array according to the first embodiment of the present invention wherein deep channels are fully filled with a conductive resin compound, the channel electrodes can have an increased effective length of light path which is otherwise difficult to realize. As a result, the driving voltage is low, the electric field is less warped due to the electrode configuration, and the cross-talk between electrodes is prevented.

In the optical shutter array according to the second embodiment of the present invention wherein pads are on channel electrodes deeply extending into an electrooptic material substrate in a direction perpendicular to its surface, wires can be readily bonded to the pads with good adherence and little breakage. The difficulty of wire bonding of prior art channel electrodes is thus overcome while maintaining the advantanges of channel electrodes that the driving voltage is low and the cross-talk between adjacent picture elements is prevented.

In the optical shutter array according to the third embodiment of the present invention wherein a transparent dielectric film covers those portions of the electrodes which are otherwise exposed to air, the transparent dielectric film not only prevents damage to the electrodes due to air discharge even in the case of closely arranged electrodes, thus offering good durability, but also prevents reflection of light on the substrate surface.

When the transparent dielectric film covers at least a driven portion in the substrate and a light-shielding dielectric film covers the remaining surface, unnecessary polarized light due to unnecessary transmission of light through the substrate except the driven portion is eliminated, providing a clearer image having a higher contrast.

In the optical shutter array fabricating method according to the fourth embodiment of the present invention wherein a conductive resin composition is applied to the channeled substrate surface in an excessive amount to fill the channels therewith and hardened before the excess resin composition is abraded away to provide a smooth surface, channel electrodes having an increased effective length of light path can be readily obtained unlike the prior art electrode formation by sputtering. A high accurary of finishing is achievable by forming channels in the substrate by machining or dry etching. The filling of conductive resin in channels has the additional benefit that the resin fill serves as a reinforcement in deep channels in a thin substrate. Thus the foregoing advantages are obtained without reducing the mechanical strength of the device.

In the optical shutter array fabricating method according to the fifth embodiment of the present invention, electrical connection to the electrodes in the substrate are achieved simply by placing an anisotropic conductive connector and a flexible printed wiring connector on the substrate and press holding them together. Troublesome operation of bonding wires to the electrodes of an optical shutter array one by one as required in the prior art is eliminated, reducing the time consumed in electrode connection. Productivity reduction due to wire breakage as often occurred in wire bonding of many wires is also prevented.

The use of a flexible printed wiring connector enables versatile electrode connection to such an optical shutter array of the structure wherein wire bonding is difficult or impossible because of the location of electrodes. The present method allows production of optical shutter arrays of varying structures.

We claim:

1. An optical shutter array comprising
   a transparent substrate formed of a material exhibiting an electrooptic effect, said substrate being provided with at least two parallel extending channels, and
   electrodes of a conductive resin composition disposed in the channels.

2. An optical shutter array according to claim 1 wherein said channels are formed by etching.

3. An optical shutter array according to claim 1 wherein said channels are formed by machining.

4. An optical shutter array according to claim 3 wherein each said channel has a depth of at least 50 μm and a transverse distance of 10 to 50 μm.

5. An optical shutter array according to claim 1 wherein the electrooptic material of which said substrate is formed is a PLZT having 9 atomic percents of La and a molar ratio of PbZrO$_3$/PbTiO$_3$ of 65/35.

6. An optical shutter array according to claim 1 wherein said conductive resin composition comprises a base resin selected from a polyimide resin and an epoxy resin, and a filler selected from gold, silver, and copper.

7. An optical shutter array comprising
   a transparent substrate formed of a material exhibiting an electrooptic effect, said substrate being provided with at least two parallel extending channels,
   an electrode of a conductive resin composition disposed in each of the channels, and
   a pad in electrical contact with at least a portion of said electrode.

8. An optical shutter array according to claim 7 wherein said channel is formed by etching.

9. An optical shutter array according to claim 7 wherein said channel is formed by machining.

10. An optical shutter array according to claim 9 wherein said channel has a depth of at least 50 μm and a transverse distance of 10 to 50 μm.

11. An optical shutter array according to claim 7 wherein the electrooptic material of which said substrate is formed is a PLZT having 9 atomic percents of La and a molar ratio of $PbZrO_3/PbTiO_3$ of 65/35.

12. An optical shutter array according to claim 7 wherein said conductive resin composition comprises a base resin selected from a polyimide resin and an epoxy resin, and a filler selected from gold, silver, and copper.

13. An optical shutter array according to claim 7 wherein said pad is a metallic thin film physically or chemically deposited on said electrode portion.

14. An optical shutter array comprising
a transparent substrate formed of a material exhibiting an electrooptic effect, said substrate being provided with at least two parallel extending channels,
electrodes of a conductive resin composition disposed in the channels, the electrodes defining a driven portion exhibiting an electrooptic effect in the substrate therebetween,
a pad in electrical contact with at least a portion of each said electrode, and
a transparent dielectric film formed on said driven portion.

15. An optical shutter array according to claim 14 wherein said channels are formed by etching.

16. An optical shutter array according to claim 14 wherein said channels are formed by machining.

17. An optical shutter array according to claim 16 wherein each said channel has a depth of at least 50 μm and a transverse distance of 10 to 50 μm.

18. An optical shutter array according to claim 14 wherein the electrooptic material of which said substrate is formed is a PLZT having 9 atomic percents of La and a molar ratio of $PbZrO_3/PbTiO_3$ of 65/35.

19. An optical shutter array according to claim 14 wherein said conductive resin composition comprises a base resin selected from a polyimide resin and an epoxy resin, and a filler selected from gold, silver, and copper.

20. An optical shutter array according to claim 14 wherein said pad is a metallic thin film physically or chemically deposited on said electrode portion.

21. An optical shutter array according to claim 14 wherein said transparent dielectric film is formed of a compound selected from the group consisting of polyimids, polycarbonates, $SiO_2$, $Si_3N_4$, and $Al_2O_3$.

22. A method for fabricating an optical shutter array, comprising the steps of:
forming at least two parallel extending channels in one surface of a transparent substrate of a material exhibiting an electrooptic effect,
applying a conductive resin composition to the channeled substrate surface in an excessive amount to fill the channels therewith, and
abrading the surface to provide a smooth surface.

23. A method according to claim 22 wherein said channels are formed by dry etching.

24. A method according to claim 22 wherein said channels are formed by machining.

25. A method according to claim 24 wherein each said channel has a depth of at least 50 μm and a transverse distance of 10 to 50 μm.

26. A method according to claim 22 wherein the electrooptic material of which said substrate is formed is a PLZT having 9 atomic percents of La and a molar ratio of $PbZrO_3/PbTiO_3$ of 65/35.

27. A method according to claim 22 wherein said conductive resin composition comprises a base resin selected from a polyimide resin and an epoxy resin, and a filler selected from gold, silver, and copper.

28. A method for fabricating an optical shutter array, comprising the steps of:
forming at least two parallel extending channels in one surface of a transparent substrate of a material exhibiting an electrooptic effect,
applying a conductive resin composition to the channeled substrate surface in an excessive amount to fill the channels therewith, and
abrading the surface to provide a smooth surface, the remaining portions of the resin composition filled in the channels constituting electrodes of the array,
placing an anisotropic conductive connector on said substrate surface,
placing a flexible printed wiring connector to overlap the anisotropic conductive connector such that conductors of the flexible printed wiring connector are in register with the electrodes in said substrate, and
press holding said anisotropic conductive connector and said flexible printed wiring connector to said substrate by fastening means, thereby achieving electrical connection between the electrodes in said substrate and rhe conductors of said flexible printed wiring connector via said anisotropic conductive connector.

29. A method according to claim 28 wherein said channels are formed by dry etching.

30. A method according to claim 28 wherein said channels are formed by machining.

31. A method according to claim 30 wherein each said channel has a depth of at least 50 μm and a transverse distance of 10 to 50 μm.

32. A method according to claim 28 wherein the electrooptic material of which said substrate is formed is a PLZT having 9 atomic percents of La and a molar ratio of $PbZrO_3/PbTiO_3$ of 65/35.

33. A method according to claim 28 wherein said conductive resin composition comprises a base resin selected from a polyimide resin and an epoxy resin, and a filler selected from gold, silver, and copper.

34. A method according to claim 28 wherein said fastening means comprises a press bar or plate.

* * * * *